United States Patent [19]
Fukumoto et al.

[11] Patent Number: 5,580,471
[45] Date of Patent: Dec. 3, 1996

[54] APPARATUS AND METHOD FOR MATERIAL TREATMENT AND INSPECTION USING FIBER-COUPLED LASER DIODE

[75] Inventors: Akira Fukumoto, Winchester; Paul Laferriere, Somerville; Abdelkrim Tatah, Arlington, all of Mass.

[73] Assignee: Panasonic Technologies, Inc., Princeton, N.J.

[21] Appl. No.: 220,119

[22] Filed: Mar. 30, 1994

[51] Int. Cl.$^6$ ............................ B23K 26/02; B23K 26/08
[52] U.S. Cl. ................ 219/121.63; 219/121.61; 219/121.76; 219/121.8
[58] Field of Search ................ 219/121.61, 121.62, 219/121.63, 121.76, 121.8, 121.78, 121.81; 350/96.18

[56] References Cited

U.S. PATENT DOCUMENTS

| | | |
|---|---|---|
| 3,803,413 | 4/1974 | Vanzetti et al. . |
| 4,481,418 | 11/1984 | Vanzetti et al. . |
| 4,531,044 | 7/1985 | Chang . |
| 4,657,169 | 4/1987 | Dostoomian et al. . |
| 4,696,101 | 9/1987 | Vanzetti et al. ............................ 29/740 |
| 4,696,104 | 9/1987 | Vanzetti et al. ............................ 29/840 |
| 4,787,696 | 11/1988 | Norris et al. ........................ 350/96.20 |
| 4,812,002 | 3/1989 | Kato et al. ............................ 350/96.18 |
| 4,893,742 | 1/1990 | Bullock . |
| 4,914,272 | 4/1990 | Ito et al. . |
| 4,963,714 | 10/1990 | Adamski et al. . |
| 4,998,005 | 3/1991 | Rathi et al. ........................ 219/121.83 |
| 5,023,426 | 6/1991 | Prokosch et al. . |
| 5,055,652 | 10/1991 | Jones et al. . |
| 5,122,635 | 6/1992 | Knodler et al. . |
| 5,216,729 | 6/1993 | Berger et al. ............................ 385/31 |
| 5,233,152 | 8/1993 | Prokosch et al. . |
| 5,311,535 | 5/1994 | Karpinski ................................ 372/50 |
| 5,337,392 | 8/1994 | Mousseaux et al. ...................... 385/90 |
| 5,373,526 | 12/1994 | Lam et al. ................................ 372/69 |

FOREIGN PATENT DOCUMENTS

| | | | |
|---|---|---|---|
| 55-48489 | 4/1980 | Japan | 219/121.62 |
| 59-174289 | 10/1984 | Japan | 219/121.61 |
| 62-45469 | 2/1987 | Japan | 219/121.62 |
| 2-142695 | 8/1990 | Japan | 219/121.8 |

OTHER PUBLICATIONS

Akira Fukumoto and Heijiro Hayami, "Laser Display Systems—They're Not Practical Yet But Their Acousto-optic Beam Deflectors Are," *J. of Electronics Engineering*, p. 40 (1975 Aug.).

Primary Examiner—Teresa J. Walberg
Assistant Examiner—J. Pelham
Attorney, Agent, or Firm—Ratner & Prestia

[57] ABSTRACT

Apparatus and method for the precision treatment of a material using a semiconductor diode for generating a plurality of laser light beams, optical fibers coupled to the diode for transmitting and combining the light beams, and a scanner for scanning the combined light beams onto the material to be treated. Also, channels micromachined onto a fixture are provided for supporting the fibers in optimum alignment with the diode. Also provided are a camera and a thermal image capturing system for generating optical and thermal images of the material. An image processing unit is provided for receiving and processing the image to generate and transmit control signals to a diode controller to control intensity and timing of the light beams, and to a controller of the scanner to control positioning of the scanner to deflect the laser beam over the material as desired.

10 Claims, 7 Drawing Sheets

APPARATUS AND METHOD FOR MATERIAL TREATMENT AND INSPECTION USING FIBER-COUPLED LASER DIODE

FIELD OF THE INVENTION

The present invention relates to precision material treatment using lasers, and more particularly, to the precision treatment of solid and liquid materials using optical fiber-coupled laser diodes wherein a laser beam is scanned onto the material and the material is inspected during and after treatment using thermo optical inspection techniques.

BACKGROUND OF THE INVENTION

Precision treatment of solid and liquid materials can be accomplished by heating the materials to a desired temperature at a location where treatment is desired. Examples of such heat treatment are soldering metallic parts, curing epoxy resins, removing plastic coatings from metals, and boring holes in solid materials.

Several techniques are currently used to perform precision heat treatment. One type of technique is optical, using focused light. This method is particularly preferred when the area to be treated is small (for example, less than 1 mm$^2$).

Presented below are examples of some basic optical material treatment systems. The first of these is an optical soldering system. In this method, a tungsten xenon lamp is used as a light-emitting heat source. Fiber bundles transmit the emitted light to the material to be treated.

The drawbacks inherent in the use of optical soldering systems include large physical size of the apparatus, large power consumption and energy loss, large heat generation, high maintenance cost because of the short useful life of tungsten xenon lamps, and relatively large size of the operative focused light spot (typically approximately 1–5 mm diameter). The large light spot renders small component soldering difficult, and may cause damage to the substrate of the material being treated due to over exposure. In addition, these systems lack an efficient inspection system to check the results of the treatment. Inspection of the treated material is primarily accomplished with a camera or through careful examination by experienced inspectors.

Another technique is solid state laser soldering. The heat source in this case is a solid state laser, typically a neodymium activated yttrium aluminum garnet (Nd:YAG) laser. Problems such as large size, excessive power consumption, energy loss, heat generation (requiring a large-scale cooling system), high maintenance costs, and lack of efficient inspection capabilities are also inherent in this technique. In addition, speckle problems are encountered in homogeneous soldering operations.

Still another technique is gas laser soldering. With this technique, a gas laser, typically a $CO_2$ laser, acts as the heat source. Large size, excessive power consumption, energy loss, heat generation, damage to nonmetallic substrate materials, and lack of efficient inspection capabilities are also inherent in this technique.

Finally, semiconductor laser soldering techniques exist. Here, a number of semiconductor diode lasers, typically III–V compound semiconductor diode lasers, are used as the heat source. This technique is particularly advantageous over the others because it solves many of the problems mentioned above, with the important exception of providing an efficient means to inspect the material after thermal treatment.

One such semiconductor diode laser soldering system is disclosed in U.S. Pat. No. 4,963,714 to Adamski et al. In that patent, a plurality of laser diodes are provided for generating a plurality of laser beams. Coupled to each laser diode is a fiber optic cable having a fiber optic strand therein that transmits the light generated by the diode. The fiber optic strands within each cable are brought together to form a single fiber optic bundle. A homogenizer is provided at the output end of the fiber optic strand bundle for converting the plurality of transmitted light outputs into a single high intensity laser beam. This laser beam is focused onto a spot on a printed circuit board where integrated circuit packages are to be connected.

In an alternative embodiment disclosed in the Adamski patent, a plurality of fiber bundles can be used to produce a plurality of high intensity laser beams simultaneously focused on the circuit board to facilitate the soldering of multiple locations concurrently, thereby reducing treatment time. Each laser diode in this apparatus has a power supply adapted to be selectively turned on and off, thereby controlling operational power to the diodes.

A laser soldering system providing some control of the laser beam is disclosed in U.S. Pat. No. 5,122,635 to Knodler et al. In this reference, a laser soldering system is provided wherein the power of the laser source and the vertical positioning of the laser are adjustable. The laser in this case is a CW-Nd:YAG laser. In one embodiment disclosed in the Knodler patent, a coupled vision system or image analysis system known in the art is mentioned for facilitating the positional assignment of the laser source.

In U.S. Pat. No. 5,023,426 to Prokosch et al., first, second, and third pattern recognition means using video cameras provide feedback to a controller. The controller manipulates a robotic arm and a staging unit to adjust the position of a circuit board under a laser beam.

U.S. Pat. Nos. 3,803,413 to Vanzetti et al., 4,481,418 to Vanzetti et al., and 4,657,169 to Dostoomian et al. disclose material inspection systems that detect infrared radiation from the material. The detected radiation values are compared to standards to yield information about the material. In the Dostoomian reference, the radiation values are used to determine the phase of solder in a reflow soldering operation. This information is then used to manipulate the soldering process.

SUMMARY OF THE INVENTION

The present invention provides apparatus and method for precision treatment of a material. A laser diode bar with a controller and a plurality of light emitting regions thereon generates a plurality of laser light beams. A plurality of bundled optical fibers are coupled to the light emitting regions for transmitting and combining the light beams. A scanner with a controller then deflects the combined light beams onto the material at locations where treatment is desired.

The invention further provides a camera to generate optical images of the material during and after treatment. An image receiver and processor receives the image generated by the camera and generates and transmits control signals to the controller of the laser diode which controls intensity and timing of the light beams. The processor also sends control signals to the controller of the scanner which controls positioning of the scanner to deflect the combined light beams as desired.

The invention further provides a thermal image generating system which is used to inspect the material during and after treatment. The thermal images are received by the image receiver and processor that generates and transmits control signals to the controller of the laser diode which controls intensity and timing of the light beams. The processor also sends control signals to the controller of the scanner which controls positioning of the scanner to deflect the combined light beams as desired.

The invention further provides a stage for supporting the material during treatment and a stage motion controller for controlling positioning of the stage.

The invention further provides a fixture with channels for supporting the optical fibers in optimum alignment with the light emitting regions. In an alternative embodiment of the invention, a plurality of fixtures are disposed relative to one another to form 2-dimensional arrays of the channels for use in high power material processing.

Also provided is a method for the precision treatment of a material by generating a plurality of laser light beams, transmitting and combining the light beams using optical fibers, bundling the fibers, and scanning the combined light beams onto the material.

The invention further provides a method of precision treating a material by generating an optical image of the material and using the optical image to generate and transmit control signals that control intensity and timing of the laser light beams and that control the scanning of the combined light beams to deflect the combined light beams as desired.

The invention further provides a method for the precision treatment of a material by generating a thermal image of the material and using the thermal image to generate signals that control the intensity and timing of the laser light beams and that control the scanning of the combined light beams to deflect the combined light beams as desired.

The invention further provides a method for the precision treatment of a material by supporting the material on a stage during treatment and controlling positioning of the stage.

Also provided is a method of supporting the optical fibers for optimum alignment with the laser light sources using channels formed in a fixture.

The apparatus and method of this invention are contemplated to apply to precision treatment processes such as soldering, wire stripping, welding, and polymer curing.

DETAILED DESCRIPTION OF THE INVENTION

Figure 1:
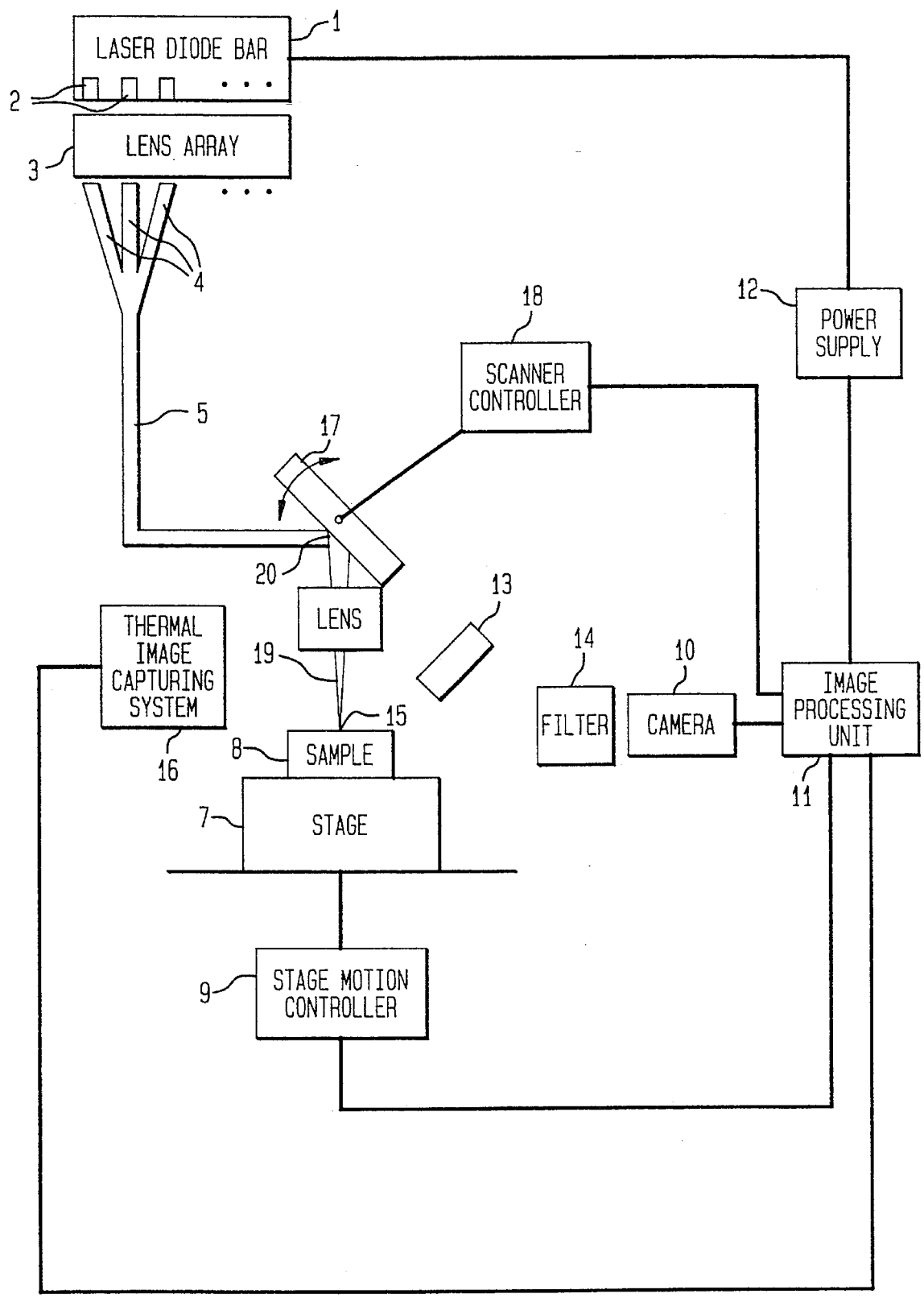
FIG. 1 is a schematic representation of an embodiment of the precision treatment apparatus of this invention.
Figure 2:
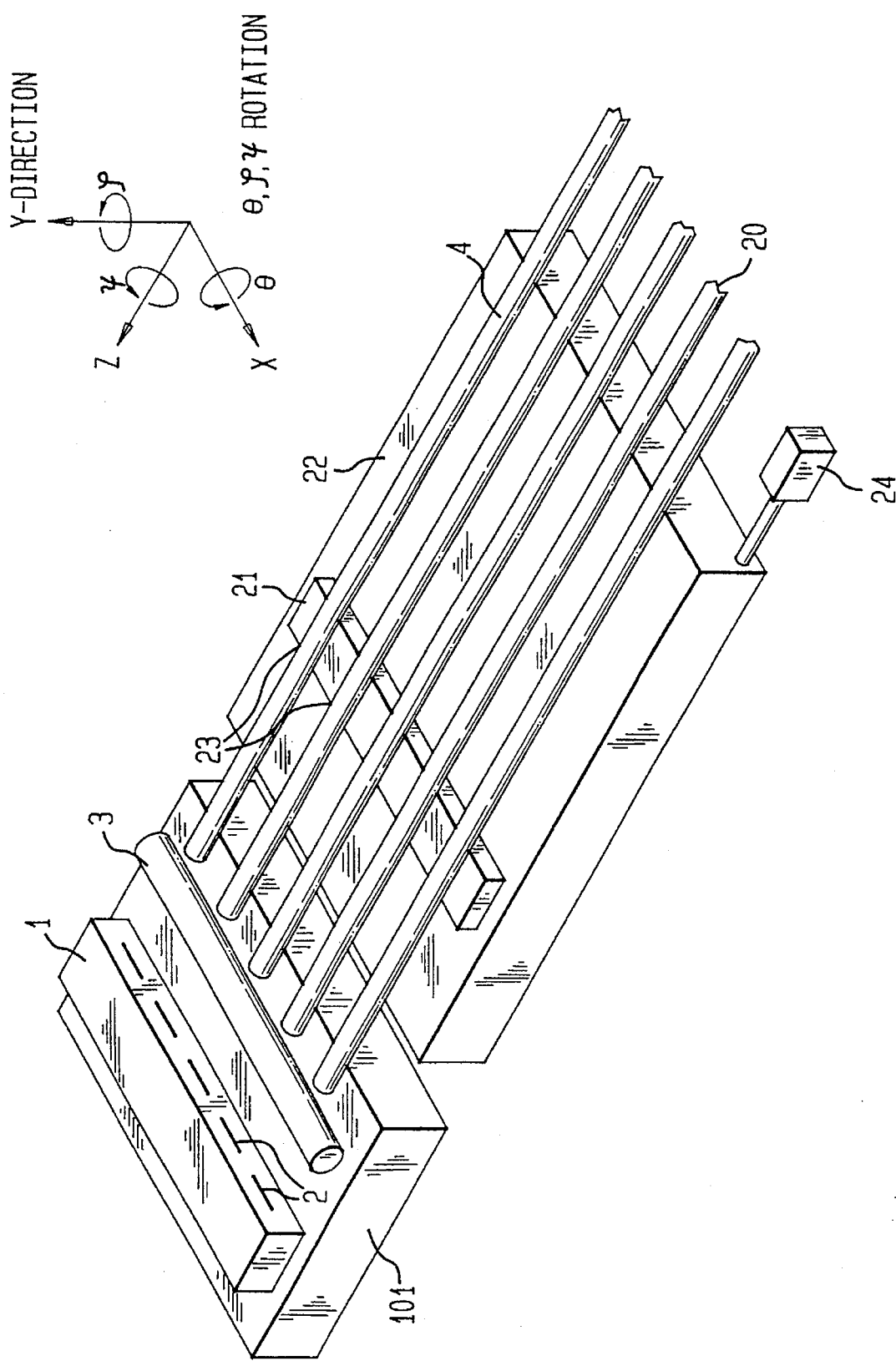
FIG. 2 is a perspective view of a portion of an embodiment of the precision treatment apparatus of this invention.

Using the present invention, precision treatment of materials is improved by the inclusion of a scanner, feedback capability, and efficient inspection means in the apparatus to better control and manipulate the treatment process. Referring to FIG. 1, a semiconductor laser diode bar 1 has a plurality of light-emitting regions 2 disposed thereon. Laser diode bar 1 sits on a bar support fixture 101, as shown in FIG. 2. An exemplary laser diode bar is Opto Power Corp.'s Model #OPC-A020-mmm-cs (approximately 1 cm wide, with an emitter to emitter distance of 400 microns and an emitter aperture size of 200×1 microns).

Light emitted from each region 2 is focused by a lens array 3 into the end of an optical fiber 4. It is important to guide each emitted light beam correctly into a corresponding fiber 4 from lens array 3. Proper alignment of fibers 4 with regions 2 is difficult and requires precision technology.

There are several factors rendering proper alignment difficult. Because of the plurality of emitting regions 2 required to generate sufficient energy from relatively low power semiconductor lasers, it is necessary to have a plurality of fibers 4. In addition, fibers 4 must be small to receive the small cross-section light beam emitted from regions 2 and to produce, when bundled, a light beam sufficiently small to treat materials with precision. The dimensions of regions 2 must also be considered to ensure proper alignment.

Figure 3:
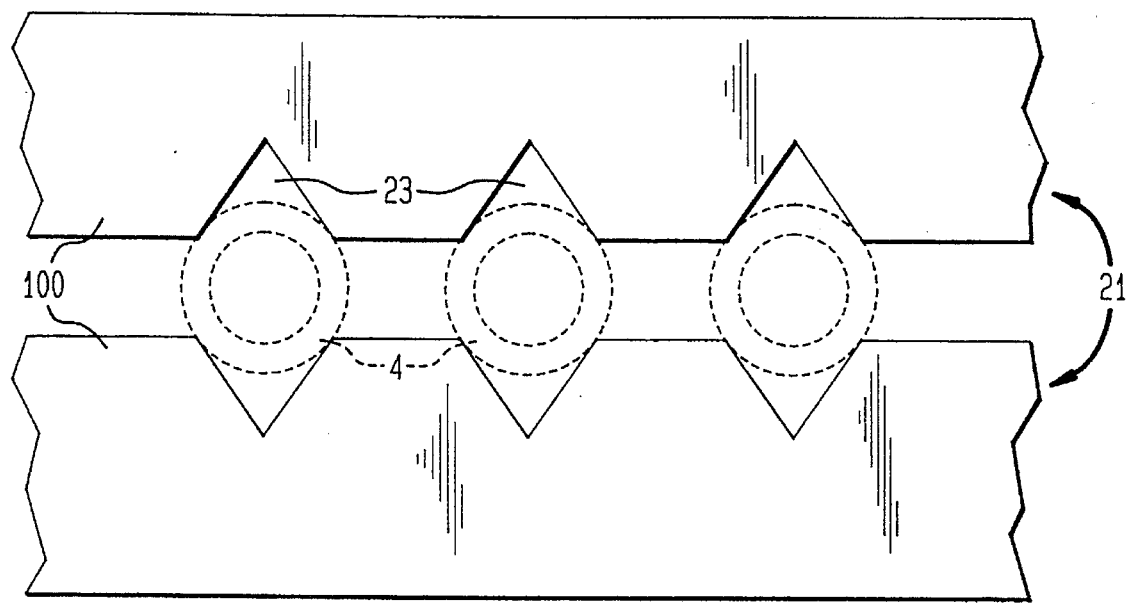
FIG. 3 is an end view of the optical fibers and fiber support fixture in an exemplary embodiment of the present invention.

Accordingly, the inventors have developed fixture 21 to facilitate proper alignment of fibers 4, as shown in FIGS. 2 and 3. In the exemplary embodiment depicted, fixture 21 is disposed on fixture base 22. Fixture 21 has a substrate 100 with channels 23 provided in substrate 100 for receiving and supporting fibers 4. Although in this exemplary embodiment, channel 23 is a V-shaped groove, the shape of channel 23 is not intended to be limited to this particular shape.

To ensure precise alignment of fibers 4 with regions 2, channels 23 are micromachined on fixture 21. Fixture 21 is preferably a metal block of stainless steel, brass, or copper, or a semiconductor such as silicon. If fixture 21 is a metal block, channels 23 are formed using a technique such as the MicroEDM system described in U.S. Pat. No. 5,256,360 entitled Method of Manufacturing a Precision Mico-Filter to Hong Li, which is incorporated herein by reference for its teaching on micromachining.

Figure 4:
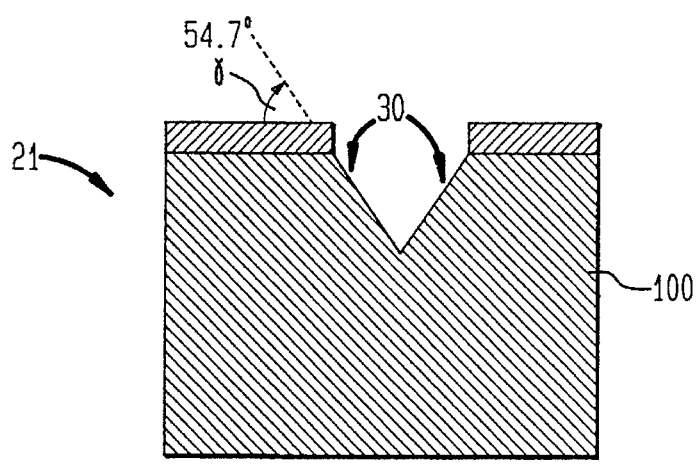
FIG. 4 is a cross-sectional view of the fiber support fixture in an exemplary embodiment of the present invention.

If fixture 21 is a semiconductor block, channels 23 are formed using the micromachining technique of etching. FIG. 4 shows an example of directional etching of a semiconductor block fixture 21 using a (111) face 30 by etching silicon substrate 100. An exemplary V-groove angle α of 54.7 degrees is illustrated.

The position of fixture base 21 is adjusted by adjusting mechanism 24. The horizontal position XYZ and tilt angles θ, ω, ψ with regard to bar 1 are adjusted while the output light intensity from fiber output ends 20 are monitored. Adjustment is optimized when the light intensity is maximum. Lens array 3 focuses light from emitting regions 2 on laser diode bar 1 into fibers 4.

Once the adjustment of fixture base 22 is optimized, fibers 4 are secured to channels 23 in fixture 21. As an example, fibers 4 are glued to channels 23 with polymer adhesives known in the art. In addition, fixture base 22 is glued to bar support fixture 101 using the same adhesives.

FIG. 3 illustrates an alternative embodiment wherein two fixtures 21 are used to align and secure fiber 4. Each fixture 21 has channels 23 and is secured to one side of fibers 4.

Figure 6:
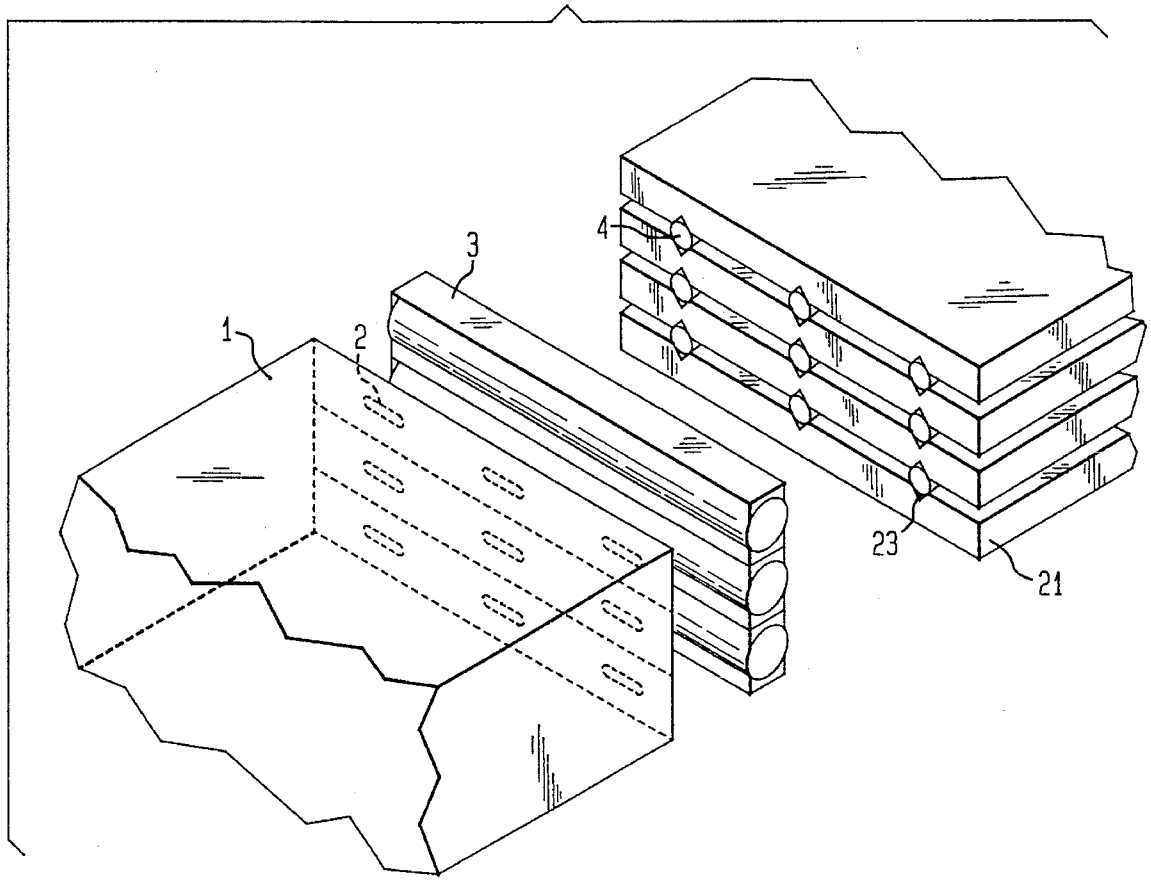
FIG. 6 is a perspective view of a portion of an alternative embodiment of the present invention showing scaling of the fiber support fixture for 2-dimensional laser diode bars.
Figure 7:
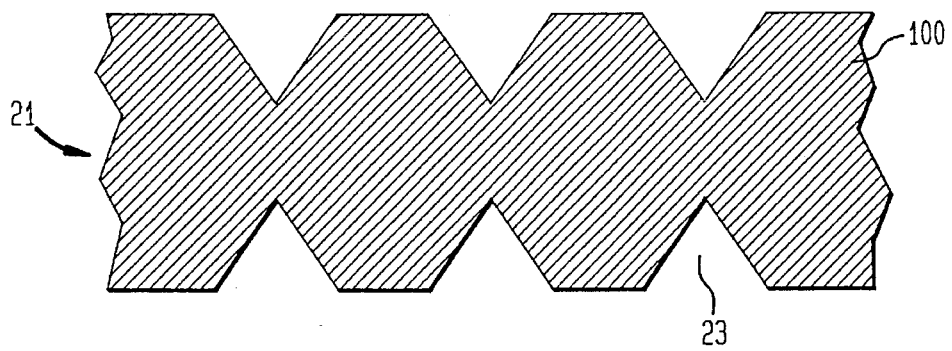
FIG. 7 is a cross-sectional view of the fiber support fixture shown in FIG. 6 for the 2-dimensional embodiment of the invention.

Another alternative embodiment is shown in FIG. 6. In this embodiment, silicon fixtures 21 are used. Silicon fixtures 21 are stacked vertically over one another, thus having the added advantage of enabling scaling to 2-dimensional laser arrays and fiber bundles for use in high power material processing. FIG. 7 illustrates mirror image grooves 23 etched on opposite sides of wafer substrate 100 to form fixture 21 used in FIG. 6. Standard optical lithography is applied to both sides of substrate 100 with use of embedded alignment marks to produce grooves 23.

Referring again to FIG. 1, a plurality of fibers 4 are bundled together to make a fiber bundle 5. Alternatively, the fibers in the bundles may be coupled to the emitters of respectively different laser diode bars. Also alternatively, a plurality of bundles may be used to generate a plurality of laser beams adapted to treat a material at plural positions simultaneously.

Light is transmitted from regions 2 through fibers 4 and fiber bundle 5 to output end 20 of fiber bundle 5. The light is emitted from output end 20 of fiber bundle 5 and shines on scanner 17, which is a device such as a galvano-magnetic mirror or an acousto-optic device. Scanner 17 is adapted to scan the light in two-dimensions. A description of an acoustic device is presented in a paper by A. Fukumoto et al., entitled "Laser Display Systems—They're Not Practical Yet But Their Acousto-optic Beam Deflectors Are," *J. of Electronics Eng.*, August 1975, p. 40, which is hereby incorporated by reference for its teaching on acousto-optic scanning techniques.

Lens 6 is provided in the light path to focus laser beam 19 into a small bright spot on sample 8. An optional illumination light source 13 is also provided. The light source 13 may be any light source suitable for use with the camera 10, as described below.

Figure 5:
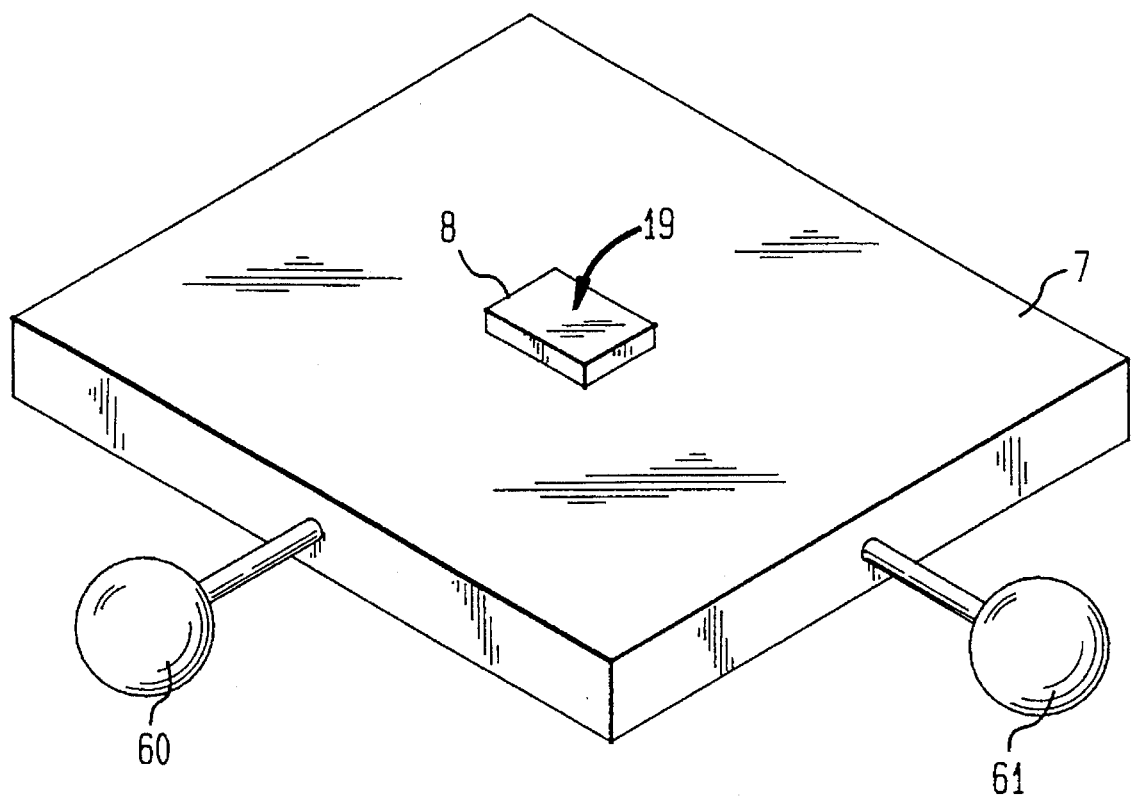
FIG. 5 is a perspective view of the sample stage in an exemplary embodiment of the present invention.
Figure 5:
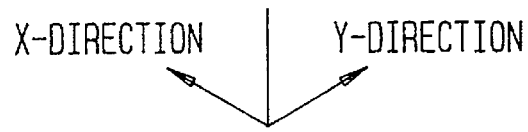

Sample 8 is supported on sample stage 7 which has horizontal and vertical motion control through stage motion controller 9. In the exemplary embodiment depicted in FIG. 5, x-position motor 60 and y-position motor 61 are used to position stage 7 for proper alignment of sample 8 under laser beam 19, which is the combined light beams transmitted by fibers 4. Both motors 60 and 61 are controlled by controller 9 (not shown). Motors 60 and 61 and controller 9 are all well-known devices in the art.

Scanner controller 18 is provided to adjust the scanner 17 to facilitate beam manipulation. If the scanner 17 is galvano-magnetic, the controller 18 is a current source that supplies a predetermined current to dispose scanner 17 at the correct angle. By sweeping the current, the scanner angle is swept to scan the beam 19 along a line. If scanner 17 is an acousto-optic deflector, the controller is a radio frequency source that varies the deflection angle of the deflector.

Using scanner 17, beam 19 is deflected along a predetermined trajectory or made to appear at randomly located spots. The intensity of beam spot 15, which will vary along the trajectory of the path of laser beam 19, can be adjusted by varying the power of the semiconductor laser diode 1 through power supply 12.

During precision optical treatment of sample 8 by laser beam 19, camera 10 generates optical images of the sample. Any known video camera can be used for this purpose. The images are transmitted to image processing unit 11 which analyzes the images obtained by camera 10. Image processing unit 11 digitizes the sample image obtained, allowing the computer to generate an accurate position of the sample. This position information is used to correct the sample position by comparing the information with previously stored position information. To prevent laser light intensity from interfering with image processing manipulation, an optical filter 14 may be disposed between sample 8 and camera 10.

Image processing unit 11 processes images from camera 10 to generate control signals. These control signals take the form of motion information that is transmitted to the scanner controller 18 (for positioning scanner 17 to manipulate laser beam 19) and stage control 9 (for accurate positioning and speed setting of stage 7 supporting sample 8). Control signals are also sent from image processing unit 11 to power supply 12 of laser diode bar 1 to control the power level and timing of the light emitted from the regions 2.

In order to efficiently inspect sample 8 during and after treatment, thermal image capturing system 16 generates a thermal image of sample 8. Examples of suitable thermal image capturing system 16 are a thermal vidicon system using a pyroelectric image capturing sensor (Panasonic manufactures such a system using a $PbTiO_3$ sensor), and an infrared image camera using semiconductor image capturing sensor (such as the Cincinnati Electronics AV10 TVS-2000 series). Thermal image capturing means 16 can be used to inspect samples during and after treatment.

Figure 8A:
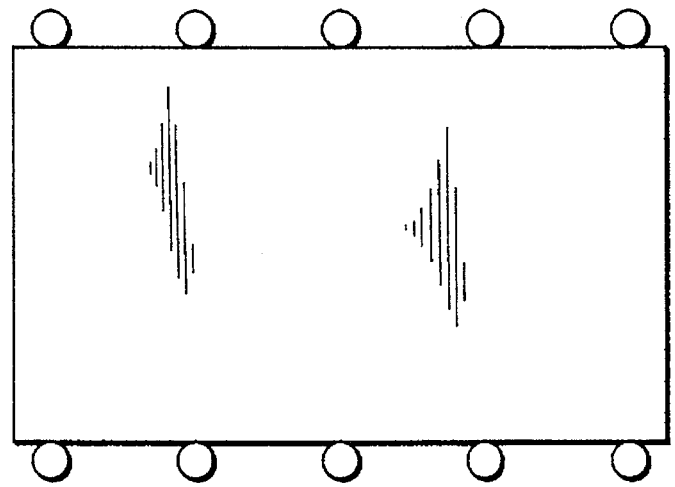
FIGS. 8(a) and 8(b) are exemplary thermal images produced by the thermal image generating system of the present invention.
Figure 8B:
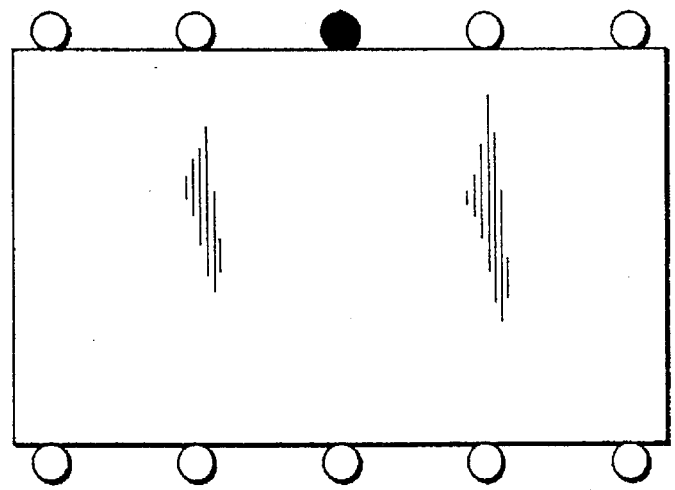

Thermal image capturing system 16 generates a two dimensional thermal image of the sample using a thermal camera. The thermal image and its temporal variation indicate the heat transfer characteristics of treated samples, which provides a measure of the thermal properties of these treated samples. Because thermal properties depend on degree of thermal treatment, the thermal image produced allows a determination of acceptable spots from unacceptable spots. In the thermal image, if all soldered spots are acceptable, the thermal images of each spot appears identical, as shown in FIG. 8(a). If one of the soldered spots is loose and therefore unacceptable, because, for example, the temperature of that spot is higher than the others, the resulting image is different, as shown in FIG. 8(b).

The apparatus of the present invention advantageously provides a small size device for precision treatment of materials with low power consumption and low heat generation. The apparatus has a high efficiency and is capable of simultaneously processing at plural sample positions. The selection of treatment spots is facilitated due to fiber flexibility. In addition, significant reduction of substrate damage is achieved. The feedback capability provided by camera 10 and image processing unit 11 in conjunction with scanner 18, power supply 12, and stage motion controller 9, enables treatment only at the correct spots with optimum optical energy. Increased flexibility and accuracy and beam manipulation is provided by scanner 10. Also, inspection of treated spots is facilitated using thermal image capturing system 16.

Figure 9A:
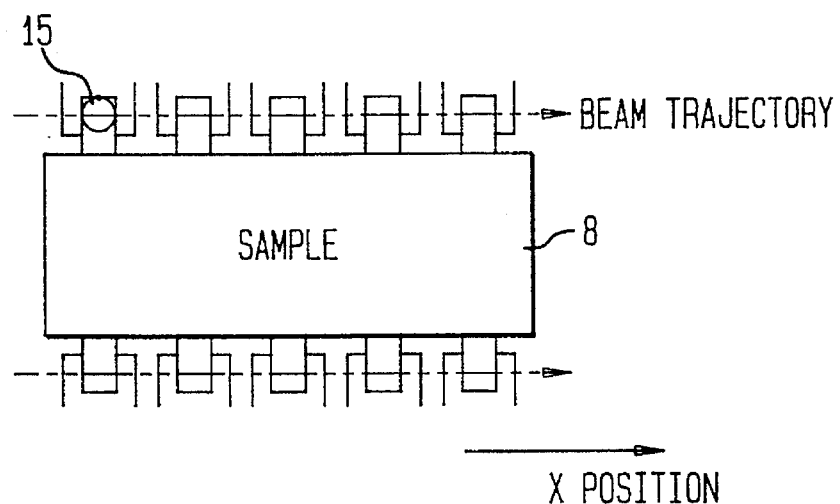
FIG. 9(a) is a representation of a material soldered using the present invention.

FIG. 9(a) is an example of an advantageous use of the present invention over the prior art. FIG. 9(a) illustrates the trajectory of light spot 15 on sample 8. The sample used in this exemplary embodiment is the dual-in-line packaging for integrated circuits, in which metal electrodes are to be soldered on pads of PCB. The dotted lines indicate light spot trajectories and each light travels from left to right. Using the current invention, the shape of the sample can be determined by camera 10 which sends this image information along, allowing identification of exact locations at which soldering is desired.

With the conventional methods discussed in the Background above, light spot control is difficult. The light spot in known devices is simply passed along a trajectory. This causes heating of non-metallic portions of the sample and damages the substrate.

Figure 9B:
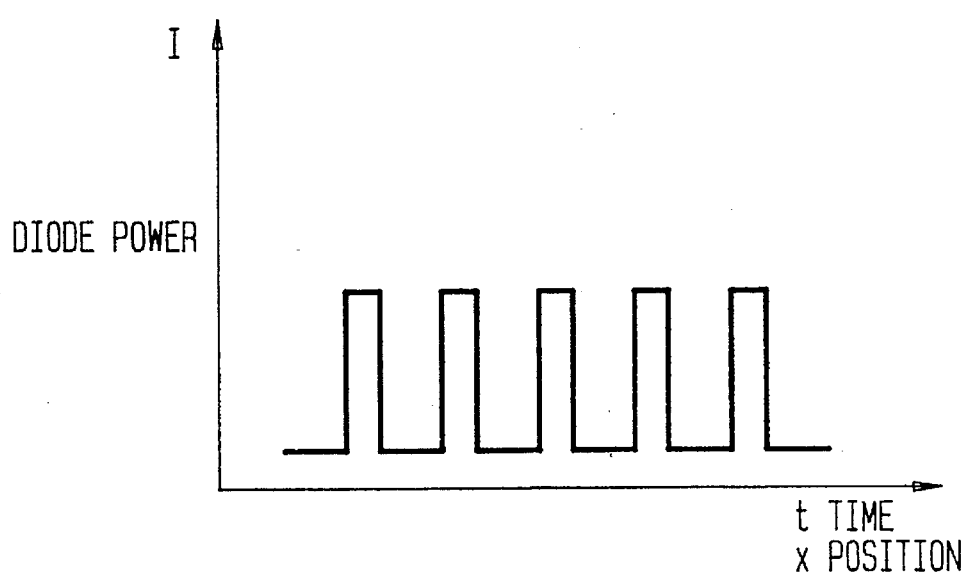
FIG. 9(b) is a graph showing the power variation of a laser diode of the present invention to treat with precision the material shown in FIG. 9(a).

With the present invention, the laser is activated only on the metal-metal bonding locations where soldering is desired. The soldering is accomplished using signals from image processing unit 11 sent to power supply 12 that energizes the laser at appropriate intervals, as shown in FIG. 9(b). Intensity I of laser diode 1 is varied with both time t and position (x-direction in this example) to power the laser only at precise locations on the material to be treated. The intensity is shown in FIG. 9(b) to be high at locations corresponding to the treatment spots of the material in FIG. 9(a).

While the present invention has been described in terms of an exemplary embodiment, it is contemplated that it may be practiced as outlined above with modifications that are within the spirit and scope of the appended claims.

We claim:

1. Apparatus for precision treatment of a material, comprising:
   (a) laser diode array means for generating a plurality of laser light beams;
   (b) means optically coupled to said generating means for transmitting and combining said light beams;
   (c) means for scanning said combined light beams onto said material;
   (d) means for generating an optical image of said material;
   (e) means for receiving and processing said optical image to generate control signals for said laser diode array means and said scanning means, wherein said control signals for said laser diode array means control intensity and timing of said laser light beams, and said control signals for said scanning means control positioning of said scanning means to deflect said combined light beams onto said material as desired;
   (f) means for generating a thermal image of said material during and after the treatment; and
   (g) means for receiving and processing said image to generate control signals for said laser diode array means and said scanning means, wherein said control signals for said laser diode array means control intensity of said laser light beams over time, and said control signals for said scanning means control positioning of said scanning means to deflect said combined light beams onto said material as desired.

2. Apparatus for precision treatment of a material as claimed in claim 1 further comprising means for supporting said material and means for controlling positioning of said supporting means.

3. Apparatus for precision treatment of a material as claimed in claim 1 further comprising micromachined means for supporting said transmitting and combining means in optimum alignment with said light generating means.

4. A fixture for use in an apparatus for precision treatment of a material having laser diode array means for generating a plurality of laser light beams and optical fibers coupled to said generating means for transmitting and combining said light beams, the fixture adapted to support said optical fibers in optimum alignment with said light generating means, said fixture comprising a substrate and at least one channel having a V-shaped cross section that is micromachined in said substrate and adapted to receive one of said optical fibers, said channel having a largest width that is smaller than an outside diameter of said optical fiber so that the fiber is supported on the top edges of the V.

5. A fixture for use in an apparatus for precision treatment of a material having laser diode array means for generating a plurality of laser light beams and optical fibers coupled to said generating means for transmitting and combining said light beams, the fixture adapted to support said optical fibers in optimum alignment with said light generating means, said fixture comprising a plurality of substrates, each substrate having at least one channel with a V-shaped cross section micromachined in said substrate, said at least one channel adapted to receive one of said optical fibers, wherein said substrates are disposed relative to one another to form 2-dimensional arrays of said channels for use in high power material processing, and wherein at least one of said substrates has at least one of said channels on two opposite surfaces thereof, said channels having a largest width that is smaller than an outside diameter of said optical fibers so that the fibers are supported on the top edges of the V.

6. A plurality of fixtures as claimed in claim 5 wherein said substrates are silicon and said channels are etched in said substrates using standard optical lithography techniques.

7. A method of precision treating a material, comprising the steps of:
   (a) generating a plurality of laser light beams using a laser diode array;
   (b) transmitting and combining said light beams by directing said light beams into optical fibers and bundling said fibers;
   (c) scanning said combined light beams onto said material;
   (d) generating an optical image of said material;
   (e) using said optical image to generate control signals that control intensity of said laser light beam over time and that control said scanning of said combined light beams to deflect said combined light beams onto said material as desired;
   (f) generating a thermal image of said material during and after treatment of the material; and
   (g) using said thermal image to generate and transmit control signals that control intensity of said laser light beams over time and that control said scanning of said combined light beams to deflect said combined light beams onto said material as desired.

8. A method of precision treating a material as claimed in claim 7 that further comprises supporting said material on a stage and controlling the positioning of said stage, thereby optimally aligning said material in relation to said light beams.

9. A method of precision treating a material as claimed in claim 7 wherein said precision treating is soldering.

10. A method of precision treating a material as claimed in claim 7 that further comprises supporting said optical fibers for optimum alignment with said light beams in at least one channel formed in a fixture using micromachining techniques.

* * * * *